United States Patent [19] [11] 3,961,476
Wasserman et al. [45] June 8, 1976

[54] METAL INTERLAYER ADHESIVE TECHNIQUE

[75] Inventors: Bernard Wasserman, Ridgecrest; Allen T. Robinson, San Diego, both of Calif.

[73] Assignee: The United States of America as represented by the Secretary of the Navy, Washington, D.C.

[22] Filed: Sept. 11, 1975

[21] Appl. No.: 612,429

[52] U.S. Cl. ................................. 60/255; 60/219; 102/103
[51] Int. Cl.$^2$ ............................................ F20K 9/04
[58] Field of Search ............... 60/219, 255; 102/103

[56] References Cited
UNITED STATES PATENTS

| | | | |
|---|---|---|---|
| 3,446,018 | 5/1969 | Macbeth | 60/255 X |
| 3,765,177 | 10/1973 | Ritchey et al. | 60/219 X |
| 3,904,715 | /0000 | Sieg et al. | 102/103 |

*Primary Examiner*—Leland A. Sebastian
*Attorney, Agent, or Firm*—R. S. Sciascia; Roy Miller; Lloyd E. K. Pohl

[57] ABSTRACT

A rocket motor is described in which a thin layer of metallic foil or the like is used between a silicone rubber insulator and an isocyanate cured, hydroxy terminated polybutadiene bound propellant grain to prevent migration of isocyanate into the silicone rubber liner.

4 Claims, No Drawings

METAL INTERLAYER ADHESIVE TECHNIQUE

BACKGROUND OF THE INVENTION

1. Field of the Invention.

This invention relates to rocket motors in which hydroxy terminated polybutadiene bound solid propellant grains and silicone rubber insulation are used. More particularly, this invention relates to the prevention of migration of isocyanate curatives from a hydroxy terminated polybutadiene bound propellant grain into a silicone rubber insulator.

2. Description of the Prior Art.

It is well known to use hydroxy terminated polybutadiene as a binder for solid rocket propellant grains. It is also well known to use isocyanates to cure hydroxy terminated polybutadiene.

It has recently become known that silicone rubber is an excellent insulator for rocket motors utilizing solid rocket propellant grains. However, when silicone rubber is utilized as an insulator in rocket motors containing isocyanate cured hydroxy terminated polybutadiene, problems arise. The problems stem from the fact that the isocyanate curatives tend to migrate from the propellant grain into the silicone rubber insulation. When this happens, an undercured surface layer of the propellant results. This undercured surface area represents a zone of weakness and, when the rocket motor is fired, the propellant grain, because of this zone of weakness, would separate from the silicone rubber insulation. When this occurs, a motor blowup is a common result. Ordinarily, excess isocyanate would be added to the rocket motor insulation to prevent isocyanate migration from the propellant grain. This is not possible with silicone rubber insulation.

SUMMARY OF THIS INVENTION

According to this invention, migration of isocyanate curatives from a hydroxy terminated polybutadiene solid propellant grain into a silicone rubber liner is prevented by means of a metallic layer between the surface of the propellant and the liner.

DESCRIPTION OF THE PREFERRED EMBODIMENT

In practicing this invention, the following steps are carried out: First, a layer of uncured dialkylor alkylaryl-siloxane (silicone rubber) is put into the rocket motor adjacent to the inner wall of the combustion chamber. The alkyl and aryl groups may be any of those which are commonly attached to the silicon atom in silicone rubbers such as methyl, ethyl, propyl, butyl, phenyl, etc.

Next, a thin layer of metal is placed adjacent to the inner wall of the uncured silicone rubber. It is undesirable to use a metal which, when burned, will produce a high exotherm. A high exotherm is defined as much more than 6000 calories per cubic centometer of metal burned. A large amount of heat added to the motor by the burning metal would disturb the beginning operation of a rocket-ramjet or the like. Accordingly, it is preferable to use a lowly exothermic metal such as copper. The metal may be in the form of foil.

Next, the silicone rubber is cured. The curing process may be any commonly used to cure silicone rubbers. As it cures, the silicone rubber bonds tightly to the metallic layer and to the inner wall of the combustion chamber.

Finally, the propellant which contains hydroxy terminated polybutadiene binder and an isocyanate curative is cast inside of and adjacent to the inner wall of the metallic layer and cured. Upon curing, the propellant bonds tightly to the metallic layer. The metallic layer, besides bonding to both the silicone rubber layer and the propellant, acts as a barrier between the two materials to prevent migration of isocyanate curative. Tests with a variety of propellants containing hydroxy terminated polybutadiene binder and an isocyanate curative bonded to copper foil showed excellent adhesion. Tensile bond specimens always failed in the propellant, indicating that the propellant-copper foil bond is stronger than the propellant. Peel tests indicate outstanding strength, with peel torques greater than forty inch-pounds per inch measured with copper foil four-thousandths inch thick.

What is claimed is:

1. A rocket motor containing a layer of silicone rubber adjacent to the inner wall of the combustion chamber and bonded thereto, a layer of lowly exothermic metal adjacent to the inner wall of the silicone rubber layer and bonded thereto and a solid rocket propellant grain inside of and adjacent to the inner wall of the metal layer and bonded thereto, the solid propellant grain containing a binder of isocyanate cured hydroxy terminated polybutadiene.

2. A rocket motor according to claim 1 wherein said lowly exothermic metal is copper.

3. A rocket motor according to claim 2 wherein said copper is in the form of a foil.

4. A method for preventing the migration of isocyanate curatives from a hydroxy terminated polybutadiene bound solid propellant grain into a silicone rubber liner, said method comprising the steps of:
 a. placing a layer of lowly exothermic metal between said propellant grain and said silicone rubber liner; and
 b. bonding said layer of metal to said propellant grain and said silicone rubber liner.

* * * * *